(12) United States Patent
Yao

(10) Patent No.: US 7,265,837 B1
(45) Date of Patent: Sep. 4, 2007

(54) SENSITIVE POLARIZATION MONITORING AND CONTROLLING

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 101 days.

(21) Appl. No.: 10/757,027

(22) Filed: Jan. 13, 2004

Related U.S. Application Data

(60) Provisional application No. 60/440,007, filed on Jan. 13, 2003.

(51) Int. Cl.
*G01J 4/00* (2006.01)
(52) U.S. Cl. ............... 356/369; 356/364; 356/367
(58) Field of Classification Search ........ 356/364–370, 356/72–73, 73.1; 398/159; 359/245, 251; 250/227, 225, 231 R
See application file for complete search history.

(56) References Cited

U.S. PATENT DOCUMENTS

| | | | | | |
|---|---|---|---|---|---|
| 4,685,773 | A | * | 8/1987 | Carlsen et al. | 359/495 |
| 4,723,315 | A | * | 2/1988 | Wetherell | 398/203 |
| 4,902,888 | A | * | 2/1990 | Kondo | 250/227.27 |
| 4,958,929 | A | * | 9/1990 | Kondo | 356/487 |
| 5,288,995 | A | * | 2/1994 | Strachan | 250/227.12 |
| 5,502,708 | A | * | 3/1996 | Morimoto | 369/14 |
| 5,675,415 | A | * | 10/1997 | Akatsu et al. | 356/364 |
| 6,166,845 | A | * | 12/2000 | Ito et al. | 359/245 |
| 6,782,211 | B1 | * | 8/2004 | Core | 398/205 |
| 7,043,122 | B2 | * | 5/2006 | Han et al. | 385/37 |

* cited by examiner

*Primary Examiner*—Sang H. Nguyen
(74) *Attorney, Agent, or Firm*—Fish & Richardson P.C.

(57) ABSTRACT

Techniques and devices for monitoring polarization of light using at least two polarization elements where the difference between the outputs of the two polarization elements are used to monitor a change in polarization.

10 Claims, 2 Drawing Sheets

SENSITIVE POLARIZATION MONITORING AND CONTROLLING

This application claims the benefit of U.S. Provisional Application No. 60/440,007 entitled "Sensitive Polarization Monitoring and Controlling" and filed on Jan. 13, 2003, the entire disclosure of which is incorporated herein by reference as part of this application.

BACKGROUND

Optical polarization is an important parameter in many optical devices and systems. A change in optical polarization of light may modify behavior of light or operation of optical devices and systems. Hence, it is desirable to monitor optical polarization of light in various applications. For one example, various optical polarization stabilizers may use an optical polarizer for monitoring the polarization.

SUMMARY

This application includes techniques, devices and systems that use two polarization elements in a polarization monitoring device to monitor the polarization state of light.

In one implementation, a method for monitoring polarization of light includes the following steps. A first partial polarization beam splitter is used to split by reflection a fraction of light in one of first and second mutually orthogonal polarization directions from an input beam to produce a first monitor beam. A second partial polarization beam splitter is used to split by reflection a fraction of the light in the one of the first and second mutually orthogonal polarization directions from the input beam to produce a second monitor beam. The first and second partial polarization beam splitters are oriented to have their polarization axes to be 90 degrees with each other. The first and the second monitor beams are then converted into first, and second detector signals, respectively. A difference between the first and the second detector signals is used to indicate an amount and a direction of a deviation in a polarization of the light from a known direction.

This and other implementations and variations are described in greater detail with reference to the drawings, the detailed description, and the claims.

DETAILED DESCRIPTION

Figure 1:
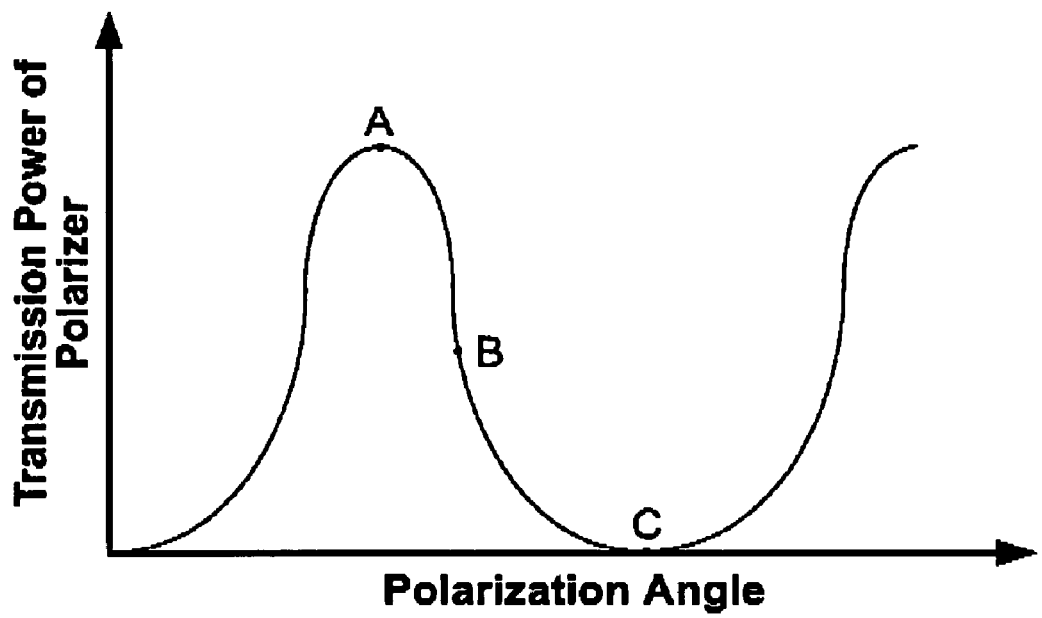
FIG. 1 shows a transfer curve of a polarizer as a function of the polarizer angle.

This application is in part based on the recognition that a polarizer when used as a polarization monitoring device may not be sufficiently sensitive to variations in polarizations when the polarizer is operated at angular locations A, B, or C in a transfer curve of the polarizer as a function of the polarizer angle. This is illustrated in FIG. 1. If the polarizer is set at the angle A (maximum transmission) or B (minimum transmission) in monitoring the polarization, the transmission power of the polarizer is least sensitive to a change in the polarization since the slope at A and B is zero. In addition, at these two operating angles A and B, the power change in the transmission of the polarizer does not directly indicate the direction of the polarization variation from the direction of the polarizer.

On the other hand, the transmission power of the polarizer would have a sensitive response to a change in the polarization angle when the polarizer is set to operate at the angle C at the waist of the transmission peak. However, the transmission loss in this operation mode is 3 dB and the power fluctuation in the input light, such as the power variation in the light source, may directly affect the accuracy of the polarization monitoring and thus the accuracy of the polarization control.

In addition, the operation at the point C presents another technical issue: the polarization under monitoring may not be unique for the same transmission output from the polarizer. For example, at the point C, two linear polarization sates orientated at ±45 degrees with respect to the passing axis of the polarizer and two circularly polarized lights (right and left hand) all have 50% of the peak power in the transmission power.

Figure 2:
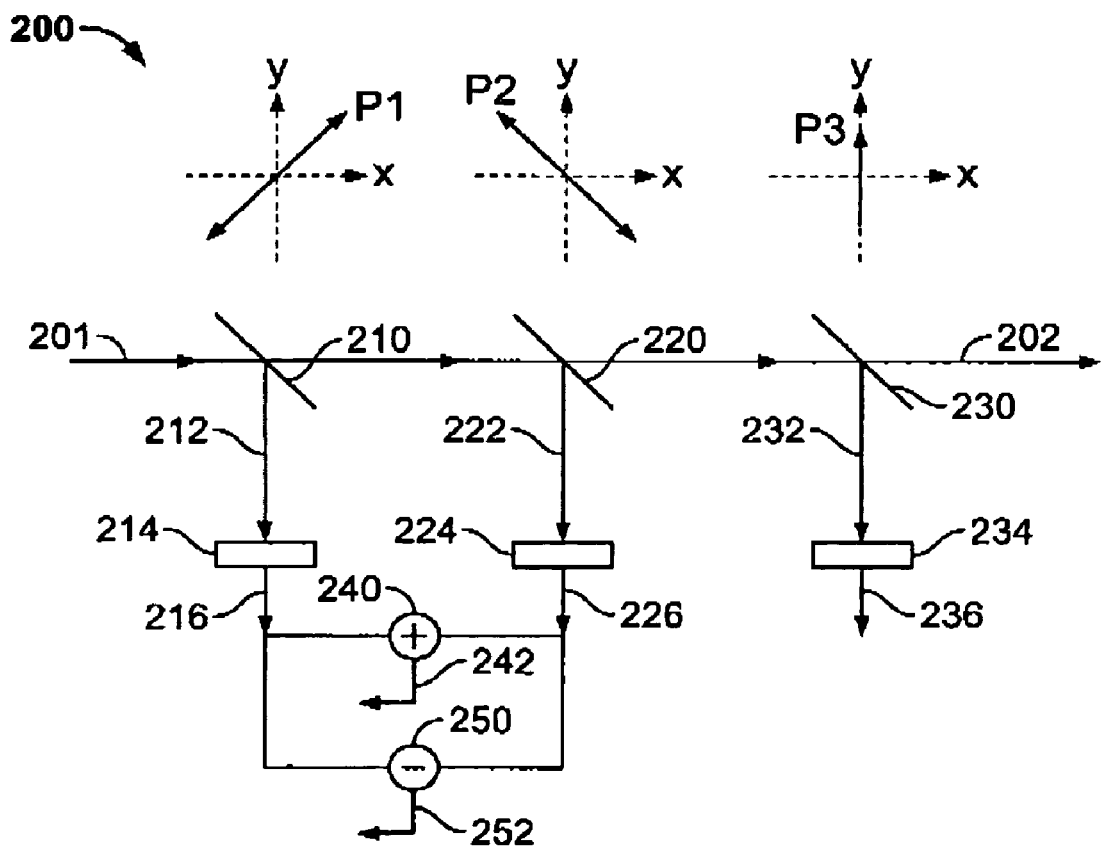
FIG. 2 illustrates one exemplary implementation of a three-element polarization monitoring device.

FIG. 2 illustrates one exemplary implementation of a three-element polarization monitoring device 200 of this application. The device 200 includes 3 partial polarization beam splitters (PBS) 210, 220, and 230 that are disposed in the optical path of an input light beam 201. The partial PBSs 210, 220, and 230 are configured to partially reflect only one polarization of the two orthogonal polarizations, for example, "S" polarization, and do not reflect the other orthogonal "p" polarization. The orientations of the polarization directions P1, P2, and P3 of the partial PBSs 210, 220, and 230 are also illustrated in FIG. 2. The $1^{st}$ and $2^{nd}$ partial polarization beam splitters 210 and 220 are oriented at 90° from each other and they are also oriented ±45° from the $3^{rd}$ partial PBS 230. Three optical detectors 214, 224, and 234 are respectively positioned to receive reflected beams 212, 222, and 232 from the PBSs 210, 220, and 230, respectively, to produce detector output signals 216 (V1), 226 (V2), and 236 (V3). A signal adder 240 is coupled to detectors 214 and 224 to produce a first signal 242 from the signals V1 and V2 and a signal subtracting device 250 is coupled to produce a second signal from signals V1 and V2.

In operation of the device 200, the signal gains $G_1$, $G_2$, and $G_3$ for the three detectors 214, 224, and 234 may be adjusted so that $V_{1max}=V_{2max}=V_{3max}$ or the differences in the detectors may be electronically calibrated during the processing. The input polarization in the beam 201 may be aligned with the reflection axis of the $3^{rd}$ partial PBS 230. When this happens, the signal $V_3$ will be at its maximum and $V_1$ and $V_2$ will be equal.

Figure 3:
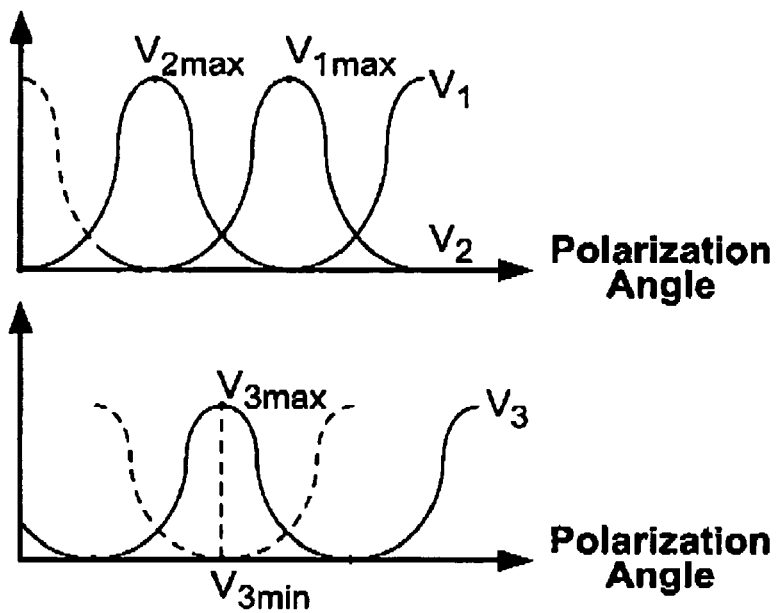
FIG. 3 shows the variation of output signals V1, V2, and V3 from three PBS elements in FIG. 2 as a function of the input polarization angle when V3 reaches maximum, V1=V2 so that (V1−V2)=0.

FIG. 3 shows the variation of $V_1$, $V_2$, and $V_3$ as a function of the input polarization angle when $V_3$ reaches maximum, $V_1=V_2$ so that (V1−V2)=0. When the input polarization angle deviates to the left side of the input polarization that produces the maximum output, $V_{3max}$, in the detector 232, the detector outputs for the detectors 212 and 222 satisfy $V_1>V_2$ so that (V1−V2)>0. When the input polarization angle is right at the angle for producing $V_{3max}$, $V_1<V_2$ so that (V1−V2)<0. Therefore, the quantity $(V_1-V_2)$ can be used to indicate both the amount of the deviation and the direction of the deviation of the input polarization with respect to the direction of the $3^{rd}$ partial PBS 230. In particular, this differential signal (V1−V2) can also tell the direction of the polarization mis-alignment: $V_1-V_2>0$ indicates that an increase of polarization angle is required while $V_1=V_2<0$ indicates that a decrease in polarization angle is required.

Furthermore, when $V_3=V_{3max}$, $V_1-V_2$ is most sensitive to polarization changes. Therefore using the differential signal of ($V_1-V_2$) as a feedback signal to control the polarization is most sensitive and the feedback loop can produce a high gain.

In yet another aspect, the sum signal ($V_1+V_2$) is a constant as a function of the polarization angle. Notably, the sum signal only changes when the optical power changes. Therefore, to eliminate power sensibility in the polarization monitoring in the device 200, the quantity ($V_1-V_2$)/($V_1+V_2$) and $V_3$/($V_1+V_2$) may be used. These two values are independent of optical power fluctuations. The signal $V_3$ (236) from the $3^{rd}$ detector 234 may also be monitored because the signal 252 of ($V_1-V_2$) alone may not indicate the difference between a linear polarization oriented along the $3^{rd}$ partial PBS 230 and circularly polarized light (RCP and LCP).

Figure 4:
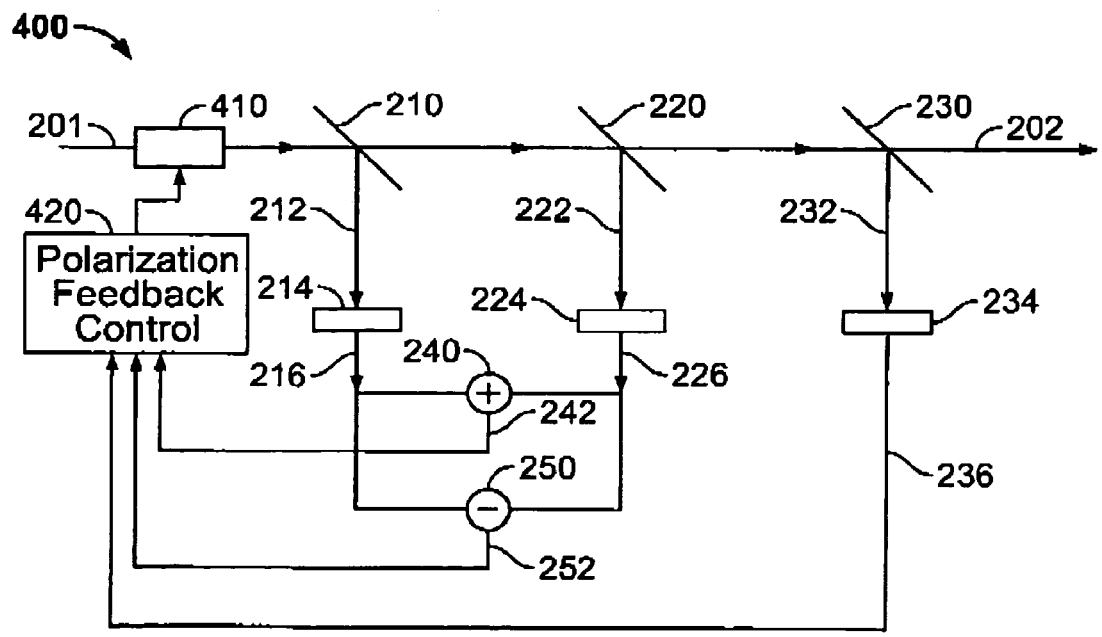
FIG. 4 shows an exemplary implementation of the polarization control system based on the polarization monitoring device in FIG. 2.

FIG. 4 further shows a polarization control system 400 based on the above polarization monitoring device 200 in FIG. 2. A polarization controller 410 is disposed at the input of the beam 201 to adjustably control the polarization of the input light. The output of the controller 410 is then monitored by the device 200 in an in-line configuration to produce an output beam 202 with a desired output polarization. A feedback control unit 420 is implemented to produce a control signal for controlling the controller 410 based on the signals 242, 252, and 236. This system 400 may be operated to stabilize the output polarization in the output beam 202. This system 400 has the advantages of being highly sensitive to polarization variation, capable of detecting the direction of polarization change, and being insensitive to laser power fluctuation of the input beam.

Other enhancements and variations of the described implementations may be made.

What is claimed is:

1. A method, comprising:
    using a first partial polarization beam splitter to split by reflection a fraction of light in one of first and second mutually orthogonal polarization directions from an input beam to produce a first monitor beam;
    using a second partial polarization beam splitter to split by reflection a fraction of said light in said one of said first and second mutually orthogonal polarization directions from said input beam to produce a second monitor beam, wherein said first and second partial polarization beam splitters are oriented to have their polarization axes to be 90 degrees with each other;
    converting said first and said second monitor beams into first, and second detector signals, respectively;
    using a difference between said first and said second detector signals to indicate an amount and a direction of a deviation in a polarization of said light from a known direction; and
    using a third partial polarization beam splitter to split by reflection a fraction of said light in said one of said first and second mutually orthogonal polarization directions from said input beam to produce a third monitor beam, wherein said third partial polarization beam splitter is oriented between polarization axed of said first and second partial polarization beam splitters at 45 degrees.

2. The method as in claim 1, further comprising using said third monitor beam to resolve an ambiguity in the input polarization.

3. The method as in claim 1, further comprising producing a normalized differential signal by dividing said difference by a sum of said first and said second detector signals to eliminate a dependence of said difference on a power level of said input beam.

4. The method as in claim 1, further comprising controlling polarization of said input light according to said difference by controlling a polarization controller disposed in said input beam.

5. The method as in claim 1, further comprising using a third partial polarization beam splitter downstream of said first and said second partial polarization beam splitters to split by reflection a fraction of said light in said one of said first and second mutually orthogonal polarization directions from said input beam to produce a third monitor beam, wherein said third partial polarization beam splitter is oriented to have a polarization axis to be at 45 degrees with respect to said first and second partial polarization beam splitters.

6. The method as in claim 5, further comprising:
    placing a polarization controlling device before said first, said second, and said third partial polarization beam splitters to control polarization of light in response to said first, said second, and said third monitor beams.

7. The method as in claim 6, further comprising using a difference between the power levels of said first and said second monitor beams as part of feedback to control the polarization controlling device.

8. A device, comprising:
    an optical path through which light propagates;
    a first partial polarization beam splitter in said optical path to split by reflection a fraction of the light in one of first and second mutually orthogonal polarization directions from an input beam to produce a first monitor beam;
    a second partial polarization beam splitter in said optical path to split by reflection a fraction of said light in said one of said first and second mutually orthogonal polarization directions from said input beam to produce a second monitor beam, wherein said first and second partial polarization beam splitters are oriented to have their polarization axes to be 90 degrees with each other;
    first and second optical detectors to respectively convert said first and said second monitor beams into first, and second detector signals, respectively;
    a circuit to receive said first and said second detector signals and to produce a difference between said first and said second detector signals to indicate an amount and a direction of a deviation in a polarization of said light from a known direction; and
    a third partial polarization beam splitter located downstream of said first and said second partial polarization beam splitters in said optical path, said third partial polarization beam splitter operable to split by reflection a fraction of said light in said one of said first and second mutually orthogonal polarization directions from said input beam to produce a third monitor beam, wherein said third partial polarization beam splitter is oriented to have a polarization axis to be at 45 degrees with respect to said first and second partial polarization beam splitters.

9. The device as in claim 8, further comprising a polarization controlling device before said first, said second, and said third partial polarization beam splitters to control polarization of light in response to said first, said second, and said third monitor beams.

10. The device as in claim 9, wherein said circuit produces a sum signal of power levels of said first and said second monitor beams, and wherein said polarization controlling device responds to the difference between said first and said second detector signals, the sum signal, and the power level of said third monitor beam to control polarization of light.

* * * * *